Patented Dec. 14, 1948

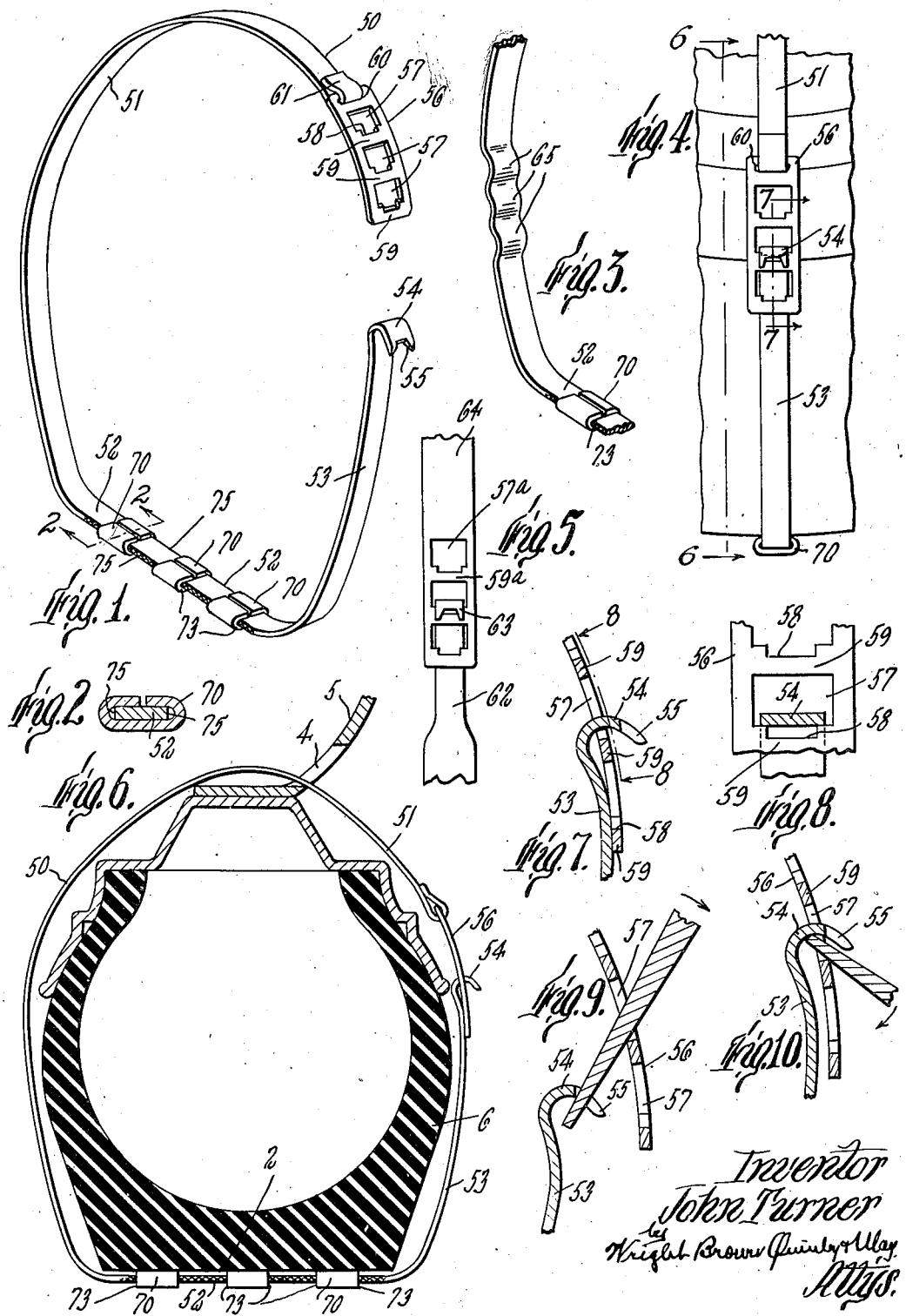

2,456,473

UNITED STATES PATENT OFFICE 2,456,473

VEHICLE TIRE ANTISKID DEVICE

John Turner, Boston, Mass.

Application January 21, 1947, Serial No. 723,429

7 Claims. (Cl. 152—226)

1

This invention relates to anti-skid devices for vehicle tires and has for an object to produce such a device highly effective both when used in deep snow or on an icy surface, and which will provide the desired traction and minimize side slippage or skidding.

A further object is to provide such a device which is quiet in operation.

Still another object is to provide such a device which does not detract noticeably from the easy riding qualities of the vehicle even when the vehicle is traveling on bare or hard ground.

A further object is to provide such a device which can be readily applied to or removed from the wheel.

Still other objects are to provide such a device having long life, easy action on the vehicle tires, of inexpensive construction, and which can be used in place of the individual lag chains.

Further objects and advantages will appear from a description of certain embodiments of the invention shown in the accompanying drawings in which Figure 1 is a perspective view showing an antiskid device embodying the invention and detached from the wheel.

Figure 2 is a detail sectional view on line 2—2 of Figure 1.

Figure 3 is a fragmentary perspective view showing a modification of the device of Figure 1.

Figure 4 is a fragmentary outer face view of a vehicle wheel showing the device of Figure 1 attached.

Figure 5 is a fragmentary view similar to a portion of Figure 4, but showing a further modification.

Figures 6 and 7 are sectional views on lines 6—6 and 7—7, respectively, of Figure 4.

Figure 8 is a detail sectional view on line 8—8 of Figure 7.

Figures 9 and 10 are detail sectional views similar to Figure 7, but showing successive stages in releasably securing ends of the device of Figures 1, 4 and 5 together.

In Figures 1, 4 and 6, there is illustrated a resilient strip of flat strap metal 50 which is bent into loop or arcuate form and preferably tempered to spring condition. This strip may, for example, be about 16 gage material, such material offering no noticeable obstruction to easy riding of the vehicle and being quiet in operation. This strap 50 has a curved portion 51 adapted to be passed through the hole 4 through the wheel body 5, as shown in Figure 6, and it also has a substantially flat portion 52 adapted to extend across the tread face 2 of the tire as a

2 continuous length. Outwardly of the tire the strap is bent upwardly as at 53 and its lower end is preferably turned over into hook form at 54 with a notch 55 in its end forming a re-entrant angle portion. The opposite end of the device is provided with an elongated loop element 56 which may be provided with a plurality of openings 57 therethrough, the lower edges of which are formed with notches 58, which are of less width than the hooked portion 54.

When the device is to be attached in position, it is threaded through the opening 4 of the wheel body, as shown in Figure 6, and the hooked portion 54 is sprung up into engagement with any selected of the cross members 59 which form the lower walls of the openings 57. The provision of a plurality of openings 57 allows for size adjustment for tire wear or the like. The parts are so arranged that in unstressed condition the hook portion is sprung somewhat spaced from the element 56, but the hook may be passed through any selected of the openings 57 and sprung into hooked engagement with the corresponding cross member 59, as by the use of a tool such as a screw driver, shown in Figures 9 and 10, which may be passed through the desired opening 57, and its end engaged in the notch 55, whereupon by turning the handle of the screw driver downwardly as shown by the arrows shown in Figures 9 and 10, the hooked portion 54 is pulled up and through the selected openings 57 and snapped over the corresponding cross member 59. The notch 58 permits the end of the screw driver to engage the cross member 59 without hindrance from the hooked end 54. A reverse action by a screw driver may be employed to disengage the hooked portion 54 from the element 56. The element 56 may be secured to the adjacent end of the strap member 50 by any suitable means as by the end portion of the strap being looped through a slot 60 therein and bent back on itself, as at 61. However, in order to avoid the necessity of attaching such an element 56 to the strap, the strap may be formed of sufficient width to have the element 56 integral therewith as is illustrated in Figure 5 in which the wider strap 64 is provided with the openings 57a with their cross members 59a and the opposite end of the strip is narrowed as at 62 and formed with a hooked extremity 63 similar to the hooked extremity 54. If desired, the strap material may be crinkled at a suitable portion of its length as is shown at 65 in Figure 3 in order to increase its flexibility.

As it is not easy to crinkle strap material laterally, to present edges obstructing lateral skidding of the wheel on which the device is attached, such edges may be provided by elements 70 which may be suitably secured to the portion 52 of the strap material. These elements may comprise pieces of similar strap material which are wrapped around the portion 52, thus presenting the side edges 73 which resist lateral skidding of the wheel. In order to secure these elements 70 against slipping, the edges 75 of the portion 52 may be knurled or otherwise roughened as shown best in Figures 1 and 6, such roughening or knurling providing for sufficient gripping of the elements 70 when they are applied to prevent such undesirable motion. The elements 70 which are wrapped about the tread portion of the device project above as well as below the strand material, and the portions which project above indent the tread surface of the tire when the tire bears on them, this tending to prevent both endwise and crosswise motion of the device on the tire surface. This increases the tractive effect and also the resistance of the device to lateral skidding. These elements 70 also offer substantial areas of contact to the tire tread and to the road which provides for increased wear on the device and easier action on the tire.

When strap metal is employed, the reaction between the wheel and the road surface during motion of the wheel tends to incline the device on the wheel, raising one edge of the tread portion of the device from the tire surface and providing increased resistance to skidding. When no skidding tends to occur, the device lies substantially flat against the tire surface so that the riding qualities of the vehicle are not noticeably impaired.

From the foregoing description of certain embodiments of this invention, it will be evident to those skilled in the art that various further modifications and changes might be made without departing from its spirit or scope.

I claim:

1. An anti-skid device comprising a resilient open loop of flat strap metal for extension laterally across the tread face of a vehicle tire and for passage through an opening through the wheel body inwardly of said tire, the portion of said loop extending across said tread face being substantially flat and presenting edge elements extending longitudinally of said tread and offering obstructions to lateral skidding of said wheel on a supporting surface, the ends of said loop being complementally formed for releasable interengagement to hold said device in position.

2. An anti-skid device comprising a resilient normally open loop of flat strap material for extension laterally across the tread face of a vehicle tire and for passage through an opening through the wheel body inwardly of said tire, the portion of said loop extending across said tread face being substantially flat, the ends of said loop being complementally formed for releasable interengagement to hold said device in position, and strap elements wrapped around said tread face loop portion and presenting edges extending longitudinally of said tread face secured to said portion and offering by such edges obstructions to lateral skidding of said wheel on a supporting surface.

3. An anti-skid device comprising a resilient open loop of flat strap material for extension laterally across the tread face of a vehicle tire and for passage through an opening through the wheel body inwardly of said tire, the portion of said loop extending across said tread face being substantially flat, the ends of said loop being complementally formed for releasable interengagement to hold said device in position, and strap elements presenting edges extending longitudinally of said tread face and wrapped about said strap material at said portion and offering by such edges obstructions to lateral skidding of said wheel on a supporting surface.

4. An anti-skid device comprising a resilient normally open loop of flat strap metal for extension laterally across the tread face of a vehicle tire and for passage through an opening through the wheel body inwardly of said tire, the portion of said loop extending across said tread face being substantially flat, one end portion of said loop being perforated, and the other end portion of said loop being provided with an integral hook for engagement in said perforation to hold said loop closed in operative position.

5. An anti-skid device comprising a resilient normally open loop of flat strap metal for extension laterally across the tread face of a vehicle tire and for passage through an opening through the wheel body inwardly of said tire, the ends of said loop being complementally formed for releasable interengagement to hold said device in position.

6. An anti-skid device comprising a resilient normally open loop of flat strap metal for extension laterally across the tread face of a vehicle tire and for passage through an opening through the wheel body inwardly of said tire, the portion of said loop extending across said tread face being substantially flat, the ends of said loop being complementally formed for releasable interengagement to hold said device in position, said skid device being normally out of contact with said tire and wheel except along said tread face and adjacent to said wheel opening.

7. An anti-skid device comprising a resilient normally open loop of flat strip metal for extension laterally across the tread face of a vehicle tire and for passage through an opening through the wheel body inwardly of said tire, the portion of said loop extending across said tread face being substantially flat and the remainder of said loop being normally out of contact with said tire and wheel except adjacent to said wheel opening, the end portions of said device being normally sprung apart, one end portion of said device being perforated and the other end of said device being formed with a two-pronged hook adapted to be engaged in said perforation to hold said device sprung into closed position, said prongs providing a notch between them with which a tool may be engaged to facilitate releasing of said hooked end from said perforation.

JOHN TURNER.

REFERENCES CITED

The following references are of record in the file of this patent:

UNITED STATES PATENTS

| Number | Name | Date |
| --- | --- | --- |
| 1,077,401 | Florack | Nov. 4, 1913 |
| 1,259,190 | Woodworth | Mar. 12, 1918 |
| 1,287,512 | Swanson | Dec. 10, 1918 |
| 1,330,480 | Kreipke | Feb. 10, 1920 |
| 1,393,986 | Wallace | Oct. 18, 1921 |
| 2,239,730 | Moore | Apr. 29, 1941 |